No. 781,203. PATENTED JAN. 31, 1905.
H. J. HEIDER.
DRAFT EQUALIZER.
APPLICATION FILED JUNE 30, 1904.
2 SHEETS—SHEET 1.
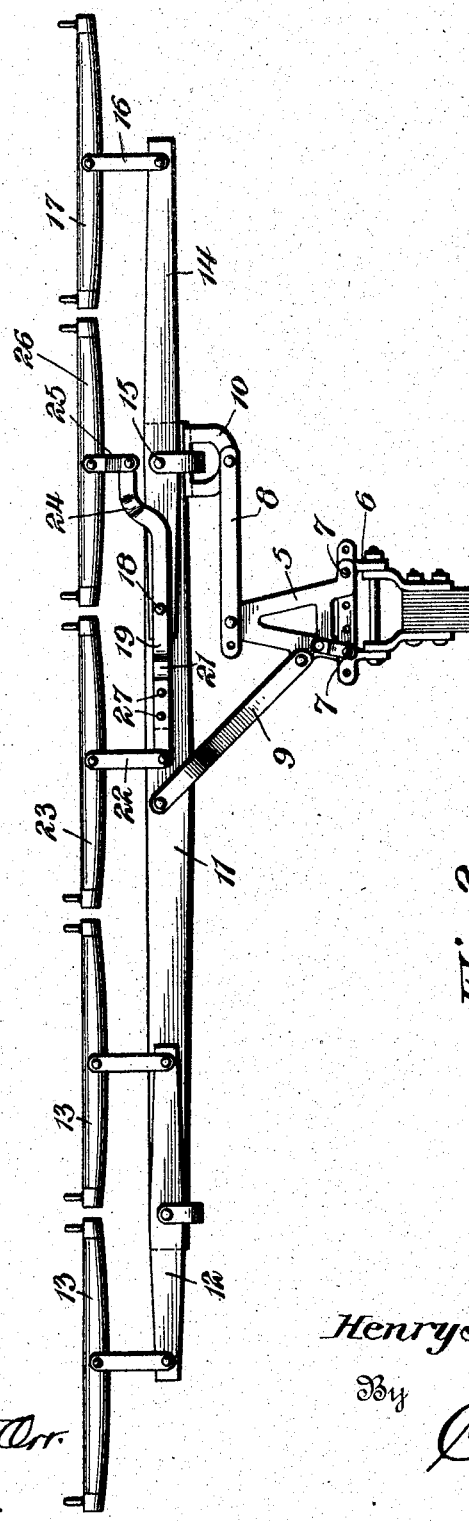
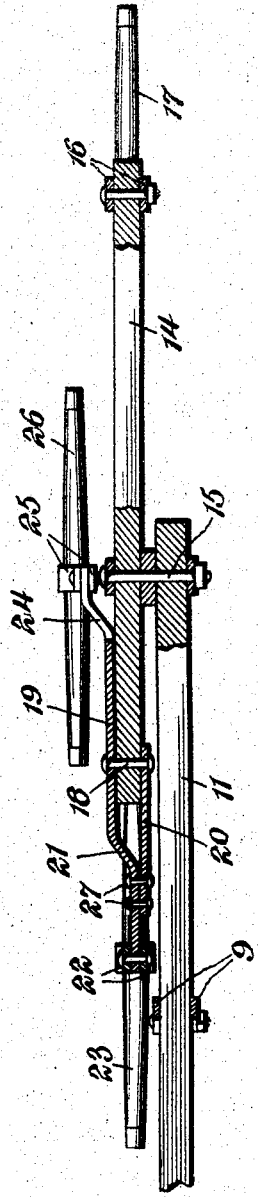
Witnesses
Howard D. Orr.
Henry J. Heider, Inventor,
By C. G. Siggers
Attorney No. 781,203. PATENTED JAN. 31, 1905.
H. J. HEIDER.
DRAFT EQUALIZER.
APPLICATION FILED JUNE 30, 1904.
2 SHEETS—SHEET 2.
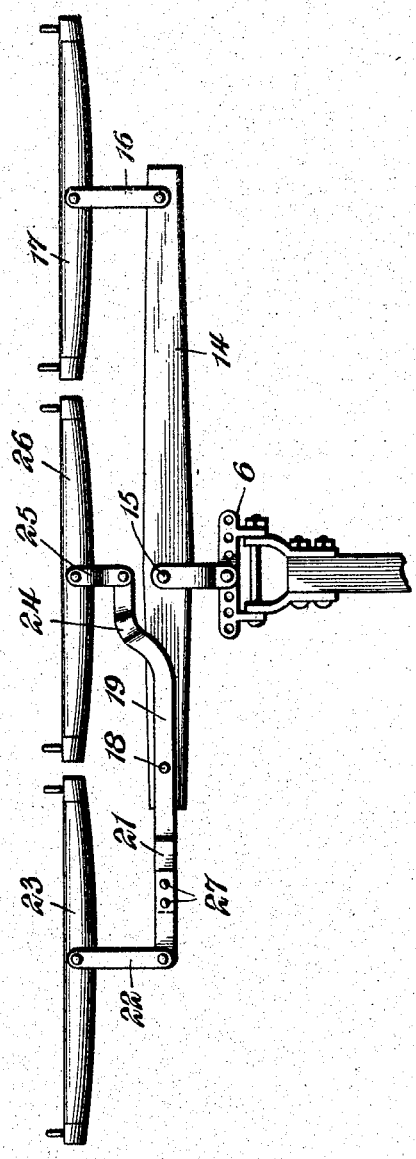
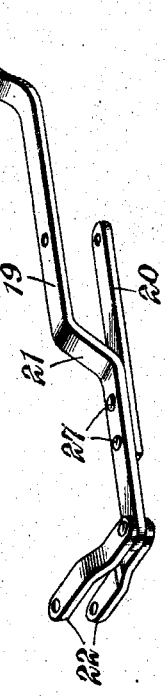
Witnesses
Howard D. Orr.
B. G. Foster.
Henry J. Heider, Inventor,
By E. G. Siggers
Attorney No. 781,203.

Patented January 31, 1905.

UNITED STATES PATENT OFFICE.

HENRY J. HEIDER, OF CARROLL, IOWA.

DRAFT-EQUALIZER.

SPECIFICATION forming part of Letters Patent No. 781,203, dated January 31, 1905.

Application filed June 30, 1904. Serial No. 214,799.

*To all whom it may concern:*

Be it known that I, HENRY J. HEIDER, a citizen of the United States, residing at Carroll, in the county of Carroll and State of Iowa, have invented a new and useful Draft-Equalizer, of which the following is a specification.

This invention relates to improvements in draft-equalizers for use on agricultural implements, and particularly plows.

The object in the present case is to provide a novel evener structure which can be employed by itself for connecting a number of draft-animals to the implement or machine or can be made a part of a larger equalizer, where it will still perform its functions and contribute to the successful operation of the whole.

The preferred embodiment of the invention is illustrated in the accompanying drawings, wherein—

Figure 1 is a plan view of an equalizer constructed in accordance with and covered by a former patent granted to me on June 23, 1903, No. 731,968, said equalizer showing the improved evener forming a part of the same. Fig. 2 is a sectional view through a portion of the equalizer, on an enlarged scale, and showing the improved evener. Fig. 3 is a plan view illustrating the evener when used by itself, and Fig. 4 is a detail perspective view of the lever and links constituting a part of said evener.

Similar reference-numerals indicate corresponding parts in all the figures of the drawings.

Briefly described, the equalizer illustrated in Fig. 1 consists of a frame 5, that is in substantially the form of the letter A, arranged to be secured to the clevis 6 of a plow by means of suitable bolts 7. To the free end of the frame is pivoted a link 8, and to one side of the frame are also pivoted links 9. The link 8 is pivotally connected to a bracket 10, secured to one end of a draft-bar 11, the link 9 being attached to said bar 11 between the ends of the same. At one end of the bar 11 is pivotally stretched a doubletree 12, to which are connected whiffletrees 13, while to the other end is secured an evener constituting the subject-matter of the present invention.

The evener in question consists of an evener-bar 14, having a pivot 15, located nearer one end than the other. To the long arm of the evener-bar is attached, by means of links 16, a whiffletree 17. To the shorter arm of said bar 14 there is connected, by means of a pivot 18, a lever comprising bar elements 19 and 20, said elements embracing the end of the lever, as shown in Fig. 2. The element 19 is pivoted between its ends to the lever and extends longitudinally thereof, one end projecting beyond the end of the lever and being downturned, as shown at 21. To this projecting end are pivotally attached links 22, connected to a whiffletree 23. The inner terminal portion of the element 21 is offset, as shown at 24, and the free end thereof is located directly in advance of the pivot 15, said free end carrying links 25, to and between which is secured a whiffletree 26. The links 25 with their pivots are preferably located in substantial alinement with the pivot 15. The element 20 is riveted or otherwise secured, as shown at 27, to the element 19 and is located beneath the evener-bar 14, terminating at the pivot 18, as illustrated in Fig. 2. An evener as thus constructed constitutes an efficient part of the equalizer illustrated in Fig. 1, in that the draft of the two animals connected to the lever is balanced by the draft of the one animal attached directly to the evener-bar 14, the strain of these three animals being in turn overcome or balanced by the team hitched to the doubletree 12. The evener, moreover, may be employed by itself, as illustrated in Fig. 3, in which case the evener-bar 14 is attached directly to the clevis of the plow, as illustrated.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a draft-equalizer, the combination with an evener-bar having a pivot, of a lever pivoted between its ends on the evener-bar on one side of the pivot thereof and extending longitudinally along said bar, the inner end of the lever being forwardly offset and disposed in advance of the evener-bar pivot, and whiffletrees connected to the lever on opposite sides of its pivot and to the evener-bar on the side of its pivot that is opposite to that carrying the lever.

2. In a draft-equalizer, the combination with an evener-bar having a pivot located nearer one end than the other, of a lever pivoted between its ends on the shorter arm of the evener-bar, said lever comprising bar elements that embrace the evener-bar, one of the elements extending longitudinally of the bar and having its inner end offset and located in advance of the evener-bar pivot, whiffletrees connected to the ends of the lever, and a whiffletree connected to the longer arm of the evener-bar.

In testimony that I claim the foregoing as my own I have hereto affixed my signature in the presence of two witnesses.

HENRY J HEIDER.

Witnesses:
J. C. HEIDER,
FRANK VAN ERDEWYK.